July 6, 1965 W. S. PARK 3,193,060
STRUCTURAL BRACING MEMBER
Filed May 29, 1962 3 Sheets-Sheet 1

INVENTOR
W. SIDNEY PARK

BY *Albert J. Kramer*

ATTORNEY

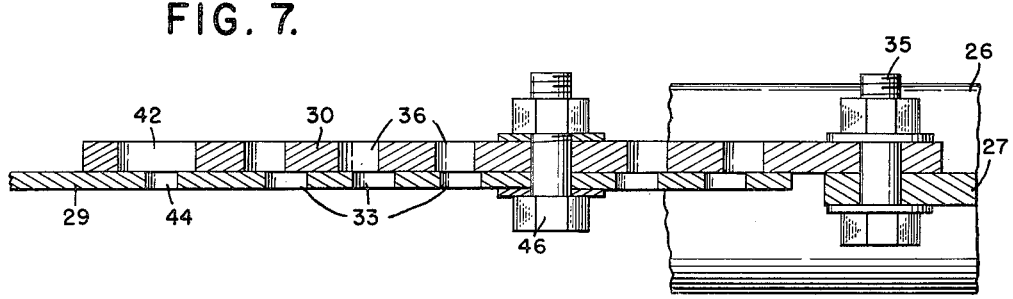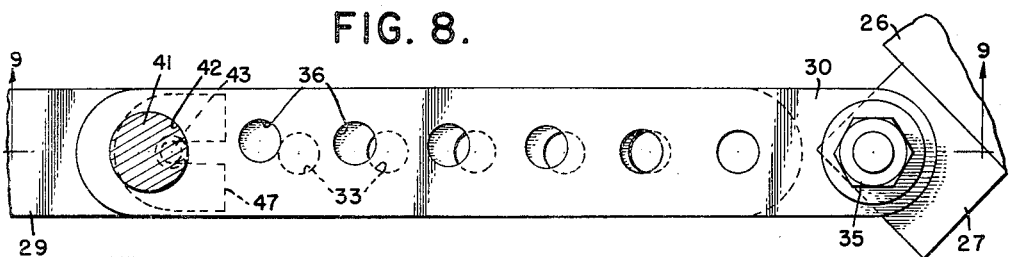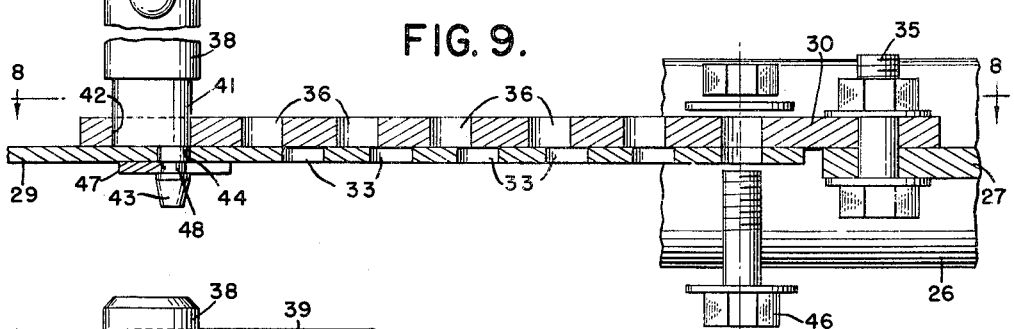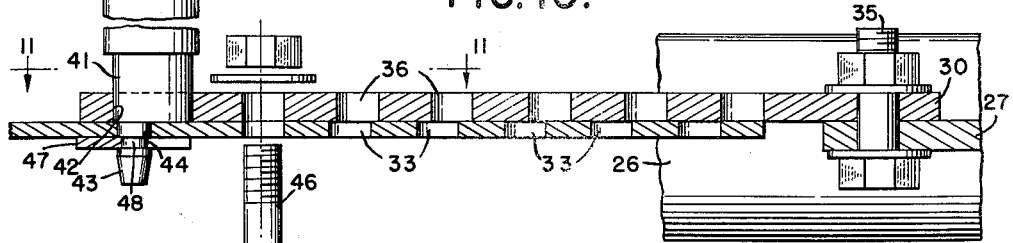

July 6, 1965   W. S. PARK   3,193,060
STRUCTURAL BRACING MEMBER
Filed May 29, 1962   3 Sheets-Sheet 3

INVENTOR.
W. SIDNEY PARK
BY
*Albert J. Kramer*
ATTORNEY

United States Patent Office 3,193,060
Patented July 6, 1965

3,193,060
STRUCTURAL BRACING MEMBER
Wallace Sidney Park, Standiford Field, Louisville, Ky.
Filed May 29, 1962, Ser. No. 198,669
2 Claims. (Cl. 189—34)

This invention relates to structural members and it is more particularly concerned with the provision of a bracing member for open frame or truss structures.

One of the objects of the invention is the provision of a structural bracing member which is adjustable in length to a high degree of accuracy in situ.

Another object of the invention is the provision of a structural bracing member which is strong, sturdy, and easy to both install and dismantle as required.

A further object of the invention is the provision of an adjustable diagonal bracing member for structures which does not require the use of turnbuckles.

A still further object of the invention is the provision of a two-part structural bracing member and means adapted thereto for incorporating the member in a structure under predetermined conditions of length and/or tension.

These and still further objects, advantages and features of the invention will appear more fully from the following description in conjunction with the accompanying drawing wherein an embodiment of the invention is shown.

Although the present invention is generally applicable to truss structures, it will hereinafter be described for illustrative purposes in reference to a typical tower construction, but it is to be understood that the invention is not limited to such a structure and can be used without limitation to any structure or situation requiring the use of bracing members.

Accordingly, in the drawing, by way of illustration:

FIG. 7 is a longitudinal sectional view along the line 7—7 of FIG. 2.

FIG. 8 is a plan sectional view of the embodiment along the line 8—8 of FIG. 9.

FIG. 9 is a longitudinal cross-sectional view along the line 9—9 of FIG. 8 illustrating the position of the tool relative to the two bar members of the embodiment after the bars are tightened to the fullest.

FIG. 10 is a view similar to FIG. 9 after the tool has been actuated to align bolt holes for connecting the members together prior to tightening.

FIG. 11 is a plan sectional view along the line 11—11 of FIG. 10.

Figure 1:
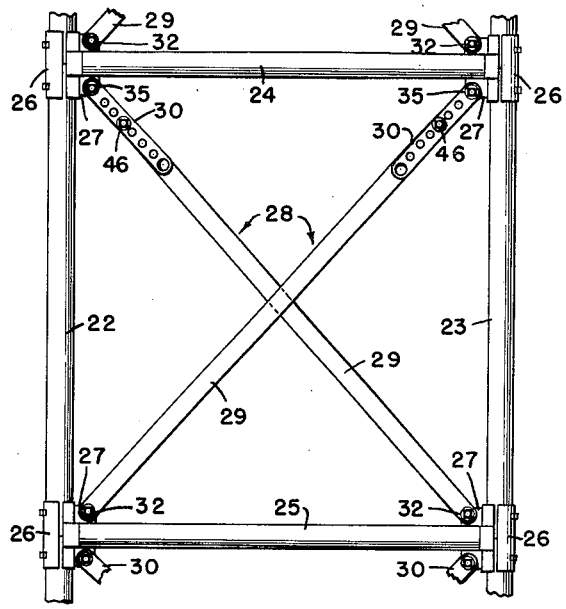
FIG. 1 is an elevational view of a fragmentary panel unit of a tower structure comprising an embodiment of the invention.
Figure 2:
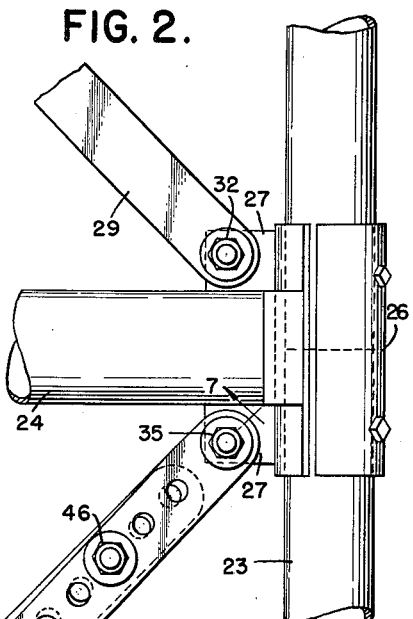
FIG. 2 is a fragmentary elevational view of a corner portion of a panel unit, on a larger scale, containing the embodiment.
Figure 5:
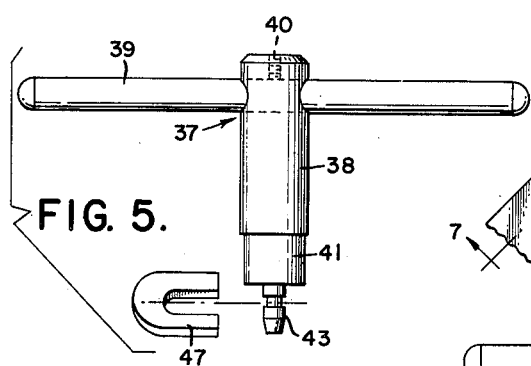
FIG. 5 is an elevational view of the tool member used in assemblying the embodiment.
Figure 6:
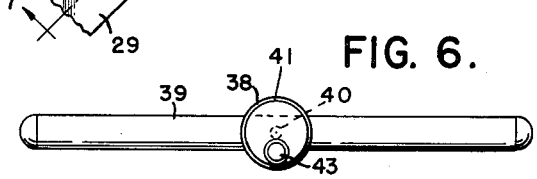
FIG. 6 is a top plan view of the tool member.
Figure 3:
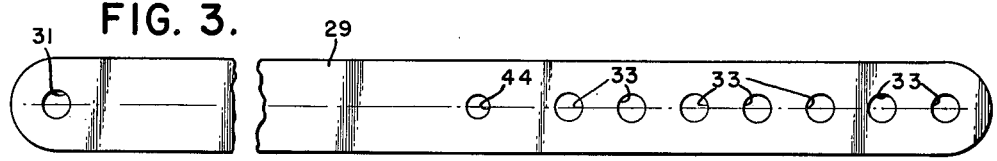
FIG. 3 is a face view of one of the two bar members of the embodiment.
Figure 4:
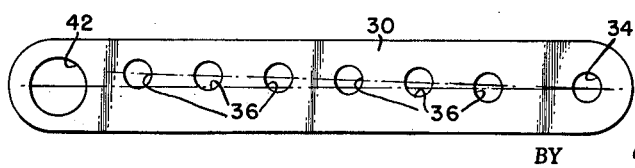
FIG. 4 is a face view of the second bar member of the embodiment.
Figure 12:
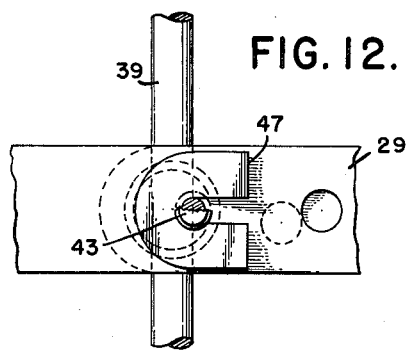
FIG. 12 is a bottom plan view of a fragmentary portion of the embodiment showing a holding means used in conjunction with the tool member.
Figure 16:
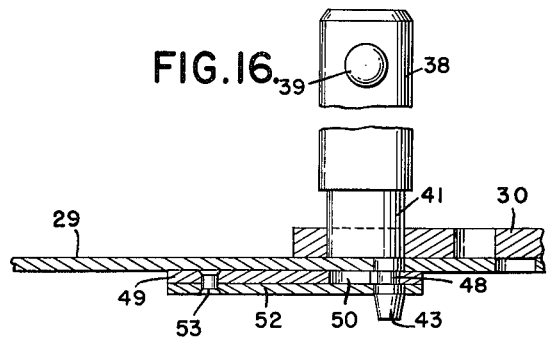
FIG. 16 is a sectional view along the line 16—16 of FIG. 15.
Figure 14:
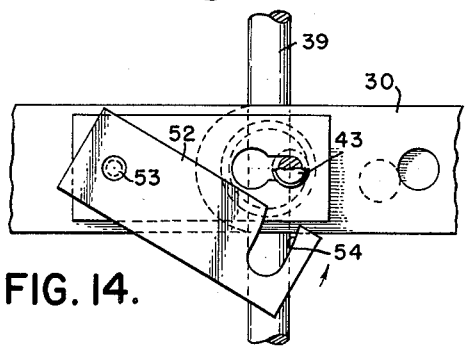
FIG. 14 is a bottom plan view, similar to FIG. 12, illustrating the use of the alternative means in open position.
Figure 15:
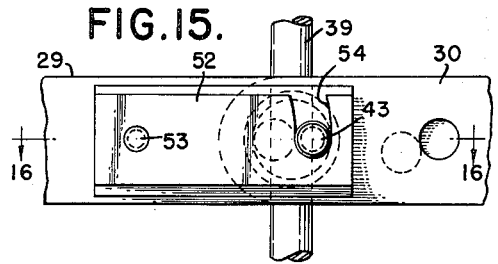
FIG. 15 is a view similar to FIG. 14 with the alternative means in locked or closed position.
Figure 13:
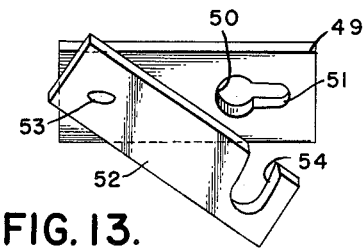
FIG. 13 is a perspective view of an alternative holding means.
Figure 17:
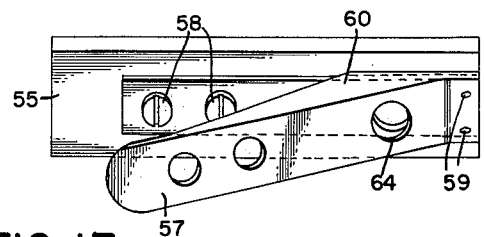
FIG. 17 is a perspective view of a second alternative holding means.

Referring with more particularity to the drawing, the embodiment is illustrated in conjunction with a rectangular structural section 21 of a tower structure, said section comprising side members 22 and 23, an upper member 24, and a lower member 25, joined together with corner clamps 26. The corner clamps each include connector plates 27 for attaching the diagonal bracing members 28.

Each member 28 comprises a relatively long bar and a shorter bar 30. The bar 29 has a bolt hole 31 at one end for connection with a bolt 32 to a connector plate 27. The opposite end of the bar 29 is provided with a group of equally spaced bolt holes 33 extending in a line longitudinally along the center of the bar.

The shorter bar 30 also has a bolt hole 34 at one end for connection by a bolt 35 to the diagonally opposite connector plate 27 of the section 21 and a group of special bolt holes 36 hereinafter more fully explained.

A tool member 37 comprises a cylindrical shank 38, the upper end of which carries a cross bar 39 secured in position by a set screw 40. The opposite end of the shank has a reduced annular portion 41 which is adapted to register with and rotatably engage an aperture 42 in the end of the bar 30 opposite the end containing the bolt hole 34. The bottom of the shank 38 is integral with an eccentric pin 43 in the bar 29 which normally lies adjacent the aperture 42.

The bolt holes 36 are progressively displaced laterally as a function of the eccentricity of the pin 43. Generally, they lie along a line which extends from the center of the outermost bolt hole of this group to a point defining the position of the center of the pin 43 when the portion 41 is disposed in the aperture 42 and with the pin in an extreme lateral position. The spacing of the bolt holes 36 is, in relation to the spacing of the bolt holes 33, as in a vernier arrangement, whereby registration of a bolt hole 36 in the one bar with a bolt hole 33 in the other bar will take place for each increment of differential displacement of the bars relative to each other.

The bracing members are easily applied to the structure by simply bolting the outer ends of the bars 29 and 30 to diagonally opposite connector plates 27 of the corner clamps 26 by means of the bolts 32 and 35. With the inner ends of the bars in overlapping position, the portion 41 of the shank 38 is inserted in the aperture 42 and the eccentric pin 43 simultaneously inserted in the aperture 44 of the bar 29. The shank 38 is then rotated to draw the bars inwardly until the desired tension or effective length in the diagonal is achieved, whereupon a securing bolt 46 is inserted in the two bolt holes between the bars that fall in alignment.

An important advantage of the invention is the fact that it permits a high degree of accuracy in the construction of structures. In tall towers, for example, it is important to maintain a high degree of geometrical accuracy in each panel to avoid cumulative errors that would result in misalignment of the structure. The diagonal bracing members are critical in this respect, because unless they are of proper length in each panel, a true geometrical figure cannot be achieved. By means of the present invention, the diagonal bracing can be installed with a high degree of precision and provides accurate geometrical structures.

In using the tool the members 29 and 30 should be held together to avoid twisting and binding of the tool shank in the apertures of these members and also to provide proper alignment of the bolt holes. One means for accomplishing this is illustrated in FIGS. 8, 9, 10, 11 and 12 and it comprises a horse-shoe shaped clip 47 adapted to frictionally engage an annular recess 49 in the shank pin 43 flush with the outer side of the member 29.

An alternative means is illustrated in FIGS. 13, 14, 15 and 16 and it comprises a plate 49 having a keyhole aperture with an enlarged portion 50 for receiving the shank pin 43 and a restricted portion 51 for engaging the recess. A retaining arm 52 is hinged by means of a pin 53 at one end to the plate 49 and is provided with a slot 54 at the other to engage the shank pin 43 when the keyhole portion 51 is engaged with the recess 48.

A third alternative means is illustrated in FIGS. 17, 18, 19 and 20. In comprises a plate 55, a leaf spring 56, and a bar 57. The spring is disposed between the plate and the bar and its ends are secured thereto, respectively, by screws 58 and rivets 59 or by any other conventional means.

Figure 19:
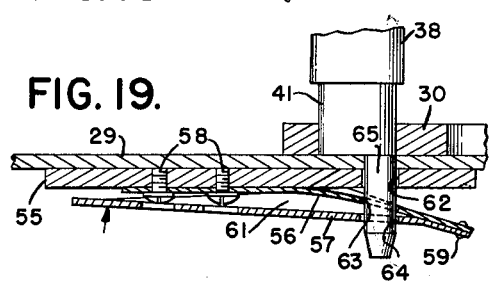
FIGS. 19 and 20 are longitudinal sectional views along the line 20—20 of FIG. 18 showing the second alternative means in its opened and locked poistions, respectively.
Figure 20:
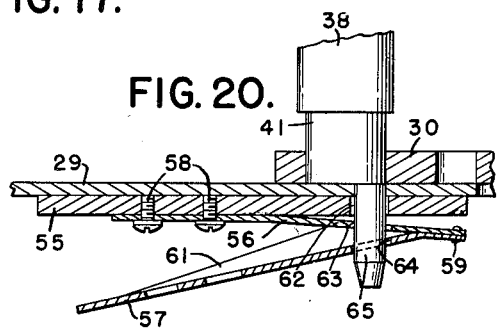
Figure 18:
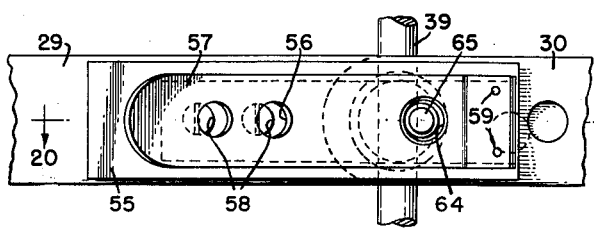
FIG. 18 is a bottom plan view of the second alternative means applied to the embodiment.

The bar 57 has flanges 60 and 61 at the sides extending toward the plate 55 whereby when pressure is applied to the bar at the end opposite to its attachment to the leaf spring as shown by the arrow in FIG. 19, the spring is arched outwardly from the plate at a substantially greater angle than it is in its normal position shown in FIG. 20. The plate, spring and bar each are provided with an aperture 62, 63 and 64, respectively, the apertures 62 and 63 being of a diameter substantially the same as the tool shank pin 65 and they are so positioned relative to each other as to be in axial alignment in the tensioned position shown in FIG. 19. In this embodiment the shank pin 65 is devoid of any annular recess but is of an increased length to permit it to pass through the apertures 62 and 63 in all relative position thereof. When the force applied to the bar 57 is released, these apertures tend to become misaligned under the force of the spring tending to change from the position of FIG. 19 to that of FIG. 20 and thereby lock the device on the shank pin to prevent axial displacement of the tool.

Having thus described my invention, I claim:

1. The combination of two longitudinal structural bars adapted to be disposed with their inner ends in longitudinal overlapping relation, said inner ends having each a longitudinal row of bolt holes, the spacing of the holes in one bar being in vernier relation to the spacing of the holes in the other bar, each bar having an aperture in addition to the bolt holes, said apertures lying normally adjacent to each other, one aperture being relatively larger than the other, a rotatable camming tool having a shank adapted to be rotatably mounted in the larger aperture, said shank having an eccentric pin projecting longitudinally from the shank for engaging said smaller aperture, and means for manually applying a rotational force to the shank, the bolt holes of one bar being laterally offset relative to the bolt holes of the other bar in an amount to compensate for the lateral shifting of the bars relative to each other by said camming tool and to bring into registry a longitudinally matching pair of bolt holes between the two bars.

2. The combination of claim 1 and means for securing the bars at their outer ends to a structure to form an integral part of structure.

References Cited by the Examiner

UNITED STATES PATENTS

| | | | |
|---|---|---|---|
| 623,627 | 4/99 | Rasmussen | 129—12 |
| 2,612,025 | 9/52 | Hunscuker | 189—20 X |
| 3,006,443 | 10/61 | Siler | 189—36 |
| 3,011,209 | 12/61 | Majeske | 74—57 X |
| 3,128,111 | 4/64 | Andrews | 160—368 X |

FOREIGN PATENTS 527,009  6/56  Canada.

FRANK L. ABBOTT, *Primary Examiner.*
RICHARD W. COOKE, Jr., *Examiner.*